(12) United States Patent
Yoskowitz

(10) Patent No.: US 9,835,354 B2
(45) Date of Patent: Dec. 5, 2017

(54) ADJUSTABLE REGULATOR AND LOCK DEVICE FOR DUCTWORK DAMPER

(71) Applicant: CAPITAL HARDWARE SUPPLY, INC., Closter, NY (US)

(72) Inventor: David Yoskowitz, Bloomsbury, NJ (US)

(73) Assignee: CAPITAL HARDWARE SUPPLY, INC., Closter, NY (US)

( * ) Notice: Subject to any disclaimer, the term of this patent is extended or adjusted under 35 U.S.C. 154(b) by 484 days.

(21) Appl. No.: 14/402,640

(22) PCT Filed: May 21, 2013

(86) PCT No.: PCT/US2013/042027
§ 371 (c)(1),
(2) Date: Nov. 20, 2014

(87) PCT Pub. No.: WO2013/177166
PCT Pub. Date: Nov. 28, 2013

(65) Prior Publication Data
US 2015/0147955 A1     May 28, 2015

Related U.S. Application Data

(60) Provisional application No. 61/649,812, filed on May 21, 2012.

(51) Int. Cl.
*F24F 13/14* (2006.01)
*F24F 13/10* (2006.01)
(Continued)

(52) U.S. Cl.
CPC .............. *F24F 13/105* (2013.01); *F16K 1/22* (2013.01); *F16K 1/221* (2013.01); *F16K 35/027* (2013.01); *F24F 13/14* (2013.01); *F24F 13/1426* (2013.01)

(58) Field of Classification Search
CPC ...................................................... F24F 13/14
(Continued)

(56) References Cited

U.S. PATENT DOCUMENTS 620,375 A    2/1899   Sterns
1,470,425 A  10/1923  Curtis
(Continued)

OTHER PUBLICATIONS

International Search Report and Written Opinion dated Aug. 30, 2013 by the European Patent Office ISA/EP, in counterpart international application No. PCT/US13/42027.
(Continued)

*Primary Examiner* — Steven B McAllister
*Assistant Examiner* — Samantha Miller
(74) *Attorney, Agent, or Firm* — Abelman, Frayne & Schwab

(57) ABSTRACT

An adjustable regulator and lock device for a pivotally rotatable damper adapted for installation in an air duct of an HVAC system is disclosed, which includes a pivot rod rotatably attached to the air duct and arranged for rotation with the damper. The pivot rod has coupled to it, a lockdown member having a plurality of radially extending teeth extending outwardly therefrom. A plate member is fixedly spaced from the air duct and has a plurality of correspondingly shaped and dimensioned tooth-shaped cutouts adapted to receive the teeth of the lockdown member to selectively lock the rotational position of the pivot rod and the damper in a selected angular orientation. The teeth of the lockdown member are biased by a coil spring toward engagement with the cutouts of the plate member, and yet selectively releasable therefrom. The invention provides secure and locked positioning of the damper.

26 Claims, 8 Drawing Sheets

(51) Int. Cl.
*F16K 35/02* (2006.01)
*F16K 1/22* (2006.01)

(58) Field of Classification Search
USPC .......................................................... 454/333
See application file for complete search history.

(56) References Cited

U.S. PATENT DOCUMENTS

| | | |
|---|---|---|
| 1,672,318 A | 6/1928 | Hinrich |
| 1,885,548 A | 11/1932 | Rosenberg |
| 2,345,997 A | 4/1944 | Anderson |
| 3,073,564 A | 1/1963 | Alter |
| 3,592,240 A * | 7/1971 | Hedrick ................... F16K 1/223 137/316 |
| RE28,492 E | 7/1975 | Hedrick et al. |
| 3,921,955 A | 11/1975 | Haddad, Jr. |
| 4,715,581 A | 12/1987 | Myers |
| 5,169,121 A | 12/1992 | Blanco et al. |
| 5,584,098 A * | 12/1996 | Koyama ............... B60H 1/0065 16/441 |
| 5,921,277 A | 7/1999 | Bernal |
| 6,082,704 A | 7/2000 | Grinsberg |
| 7,472,699 B2 | 1/2009 | Martin et al. |
| 7,530,891 B2 | 5/2009 | Perrin |
| 7,533,691 B2 * | 5/2009 | Marcoux ............. F24F 13/1426 137/523 |
| 2008/0113613 A1 | 5/2008 | Petrossian |
| 2009/0093209 A1 | 4/2009 | Bernal |
| 2009/0197522 A1 | 8/2009 | Perrin |
| 2012/0071083 A1 | 3/2012 | Gribble |

OTHER PUBLICATIONS

International Preliminary Report on Patentability dated Oct. 24, 2014 by the IPEA/US in counterpart international application No. PCT/US13/42027.

* cited by examiner

ADJUSTABLE REGULATOR AND LOCK DEVICE FOR DUCTWORK DAMPER

CROSS-REFERENCE TO RELATED APPLICATIONS

This application claims priority to U.S. provisional application No. 61/649,812, filed May 21, 2012, the disclosure of which is incorporated by reference herein its entirety, and made a part of this application.

BACKGROUND OF THE INVENTION

1. Field of the Invention

The present invention relates to an adjustable regulator and lock device for controlling the flow of conditioned air in ducts of heating, ventilating and air conditioning systems, commonly referred to as "HVAC" systems. In particular, the present invention relates to a damper adjustment and positioning lock.

2. Description of the Related Art

It is well known in ducted heating, ventilating or air conditioning systems to provide, at selected locations, regulating damper assemblies for controlling the rate of flow of air or the like through the ducts of the HVAC system. Such known ductwork damper assemblies generally include a damper blade made of sheet metal and dimensioned to conform substantially to the cross-section of the air duct intended for passage of air or the like in a regulated manner. In general, the damper blade has a circular shape and is fitted in a circular air duct of slightly larger diameter to permit pivotal rotation of the damper blade. The damper blade is rotatably attached to a shaft (i.e., pivot rod) which is itself rotatably connected to the duct by bearing-type bushings, such that the blade is pivotable within the duct as the shaft is rotated. One end of the shaft extends outwardly from the duct and is pivotally rotatable through a lever or other device, to one of a number of selected angular orientations to control the airflow through the duct. Various types of known devices using levers of various types are used to rotate the damper blade and to fix it in a pre-selected angular orientation.

Generally, rotation of the lever causes the damper blade shaft to rotate within the duct, and thereby produce corresponding rotation of the damper blade. The damper blade may be rotated between an open position where the air duct is in a fully open configuration, allowing air to pass therethrough, and a closed position, whereby the flow of air is blocked, causing it to be diverted in a different direction to a different location.

Various devices have been made to improve the ability to pivot and fix such damper blades to a particular angular orientation within the air duct between fully open and fully closed configurations. For example, various arrangements of levers and wingnut-type locking mechanisms have been incorporated to manually pivot and fix the position of the damper blade. These arrangements however, are cumbersome to use, and as well, do not provide sufficiently stable and fixed positioning of the damper blade when locked in position. Moreover, they do not provide an easily visible indicator to the user of the position of the damper, which is always hidden from view within the ductwork assembly.

The present invention is directed to an adjustable regulator and lock device for adjusting a damper in the air duct of a ductwork assembly, for the purpose of controlling the flow of conditioned air therethrough. In particular, the present invention provides fixed and stable adjustment of the damper blade orientation through the engagement of a multiplicity of engaging lockdown teeth with a corresponding multiplicity of complementary controlling tooth shaped cutouts in a fixed plate member mounted adjacent the air duct, while yet providing a ready and visible display indicator to the user of the actual angular position of the damper.

SUMMARY OF THE INVENTION

An adjustable regulator and lock device for a damper adapted for installation in an air duct is disclosed, which comprises an elongated member coupled to the damper for rotation therewith, the elongated member having a generally longitudinal rotational axis, a plate member positioned adjacent and outside of the air duct, the plate member having an opening through which the elongated member extends. A lockdown member has a plurality of outwardly extending engagement devices rotatably coupled with the elongated member and movable toward and away from the plate member in directions extending along the longitudinal axis. A plurality of correspondingly positioned, configured and dimensioned mating engagement devices are associated with the plate member, the engagement devices of the plate member being adapted to engage with the engagement devices on the elongated member when the elongated member and the damper are rotated to a selected angular position, and the engagement devices coupled with the elongated member are placed into engagement with the engagement devices of the plate member to prevent rotation of the elongated member and thereby fix the angular orientation of the damper.

The lockdown member preferably comprises a plurality of radially outwardly extending teeth. The plurality of mating engagement devices of the plate member preferably comprise a plurality of tooth-shaped cutouts in the plate member, configured similar to the cross-sectional shape of the radially extending teeth of said lockdown member.

The radially outwardly extending teeth coupled with the lockdown member are preferably triangular in shape.

In an alternative embodiment the outermost dimension of the radially outwardly extending teeth is progressively increased as measured along the length of the elongated member and in a direction extending from the plate member toward the duct, such that the lockdown member and the teeth have a generally tapered side elevational profile.

The plurality of teeth are movable longitudinally with respect to the plate member for respective receptive engagement and disengagement with the plurality of tooth-shaped cutouts of the plate member, to thereby fix the angular orientation of the longitudinal member and the damper. Preferably a manually operable device is positioned outside the plate member and coupled with the lockdown member for movement of the lockdown member and the outwardly extending teeth into and out of engagement with the cutouts of the plate member.

A resilient device preferably in the form of a coil spring, is positioned between the manually operable device and the plate member and arranged to bias the outwardly extending teeth of the lockdown member into engagement with the tooth-shaped cutouts of the plate member.

The tooth shaped cutouts in the plate member are generally triangular to match the cross-section of each of the outwardly extending teeth coupled to the pivot rod. The manually operable device is preferably a grip knob, and the coil spring is positioned between the grip knob and the plate member. In an alternative embodiment, the outermost dimension of the radially outwardly extending teeth is constant as measured along the length of the elongated member.

An adjustable regulator and lock device for a pivotally rotatable damper adapted for installation in an air duct is also disclosed, which comprises a pivot rod extending through the air duct and generally transverse to the direction of air flow, the pivot rod having the damper rotatably coupled thereto and being rotatably mounted on the air duct for rotation between open and closed positions of the damper. A plate member is mounted to the outside of the air duct and generally facing an outer surface portion of the air duct, the plate member having an opening through which the pivot rod extends.

A lockdown member is rotatably coupled to the pivot rod and has a plurality of engagement devices movable into and out of engagement with correspondingly positioned mating engagement devices associated with the plate member to selectively fix the rotational position of the damper. The lockdown member is manually rotatable by a grip knob rotatably coupled with the lockdown member and adapted to move the lockdown member longitudinally with respect to the plate member and the pivot rod, into and out of engagement with the mating engagement devices of the plate member. The lockdown member is biased toward an engaged locked position with the plate member by a resilient member positioned between the grip knob and the plate member.

A damper unit as described hereinabove is also disclosed in combination with sheet metal ductwork of an HVAC system or the like, having an air duct. The damper unit as described herein is incorporated by reference into this paragraph.

Ductwork for directing conditioned air in a predetermined direction, is also disclosed which combines at least a section of sheet metal ductwork having an air duct having a generally tubular configuration and a generally circular cross-section with a damper unit according to the invention. The description of the damper unit as set forth herein is incorporated by reference into this paragraph.

BRIEF DESCRIPTION OF THE DRAWINGS

Preferred embodiments of the invention will be described with reference to the drawings, wherein.

DETAILED DESCRIPTION OF THE INVENTION

Figure 1:
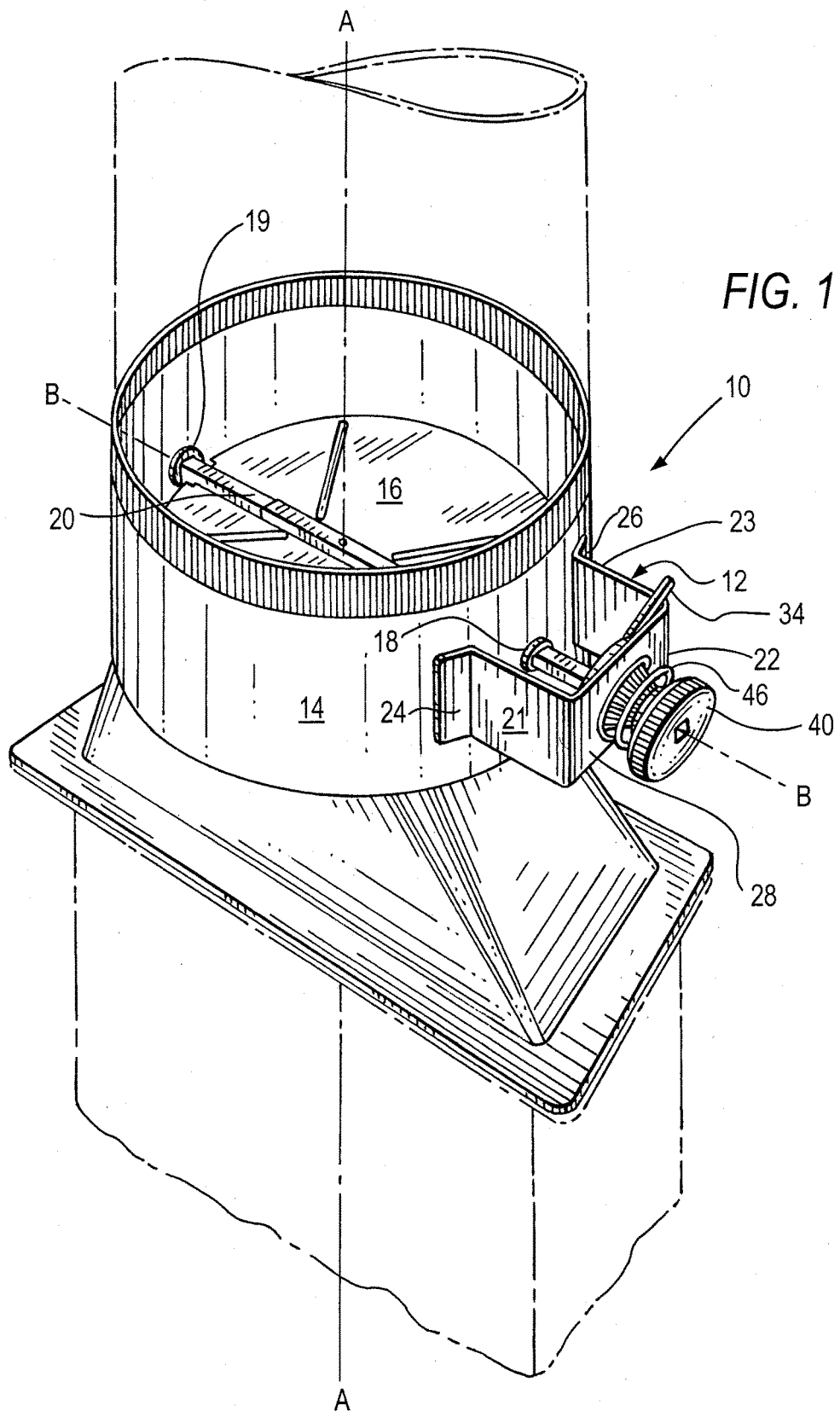
FIG. 1 is a front, top and left side perspective view of a ductwork damper assembly incorporating an adjustable damper regulator and lock device according to the invention, for controlling the flow of conditioned air in an air duct of an HVAC system.
Figure 2:
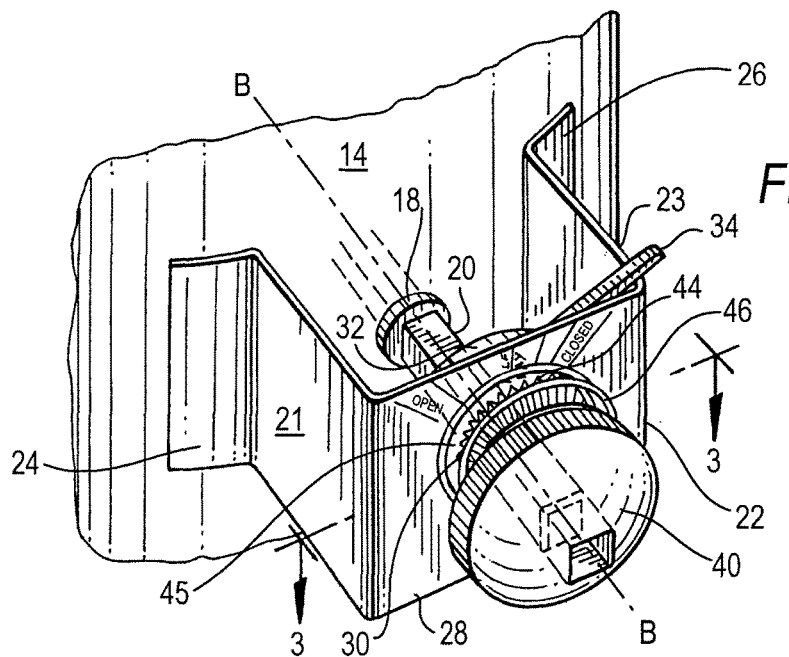
FIG. 2 is a front, top and left side perspective view of the present inventive adjustable damper regulator and lock device shown in FIG. 1, for adjusting and locking the damper blade of the damper assembly in a pre-determined angular position.
Figure 4:
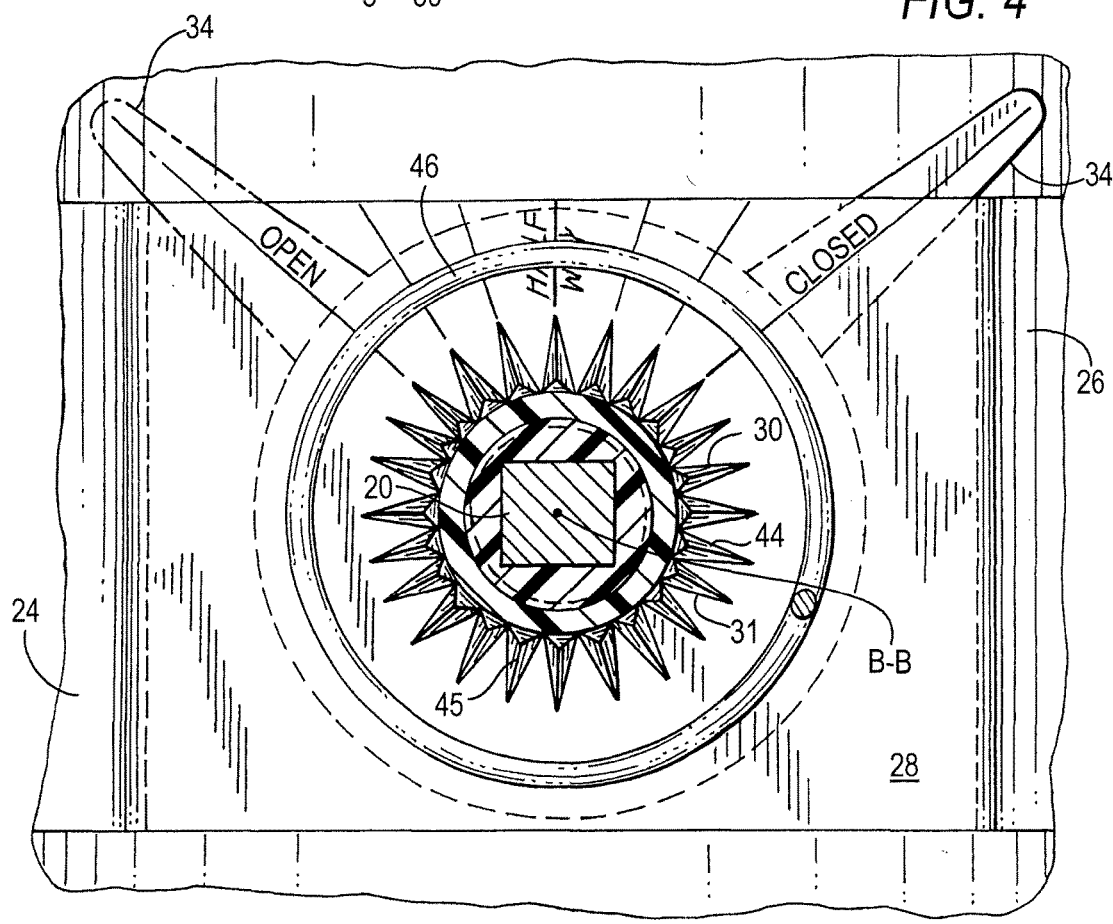
FIG. 4 is a partial cross-sectional view, taken along lines 4-4 of FIG. 3, showing the star shaped adjusting device of the adjustable damper regulator and lockdown device of the invention in the locked position shown in FIG. 3.

Referring initially to FIG. 1, there is illustrated a damper assembly 10 for a heating, ventilating and air conditioning (hereafter HVAC) system, incorporating an adjustable regulator and lock device 12 constructed according to the present invention. The damper assembly includes duct 14 having a generally circular configuration, on which damper blade 16 is pivotably mounted on suitable bushings 18 as shown. The bushings 18 can be of any known type, or of the type disclosed in my copending patent applications, including U.S. provisional application No. 61/573,679, filed Sep. 9, 2011, U.S. patent application Ser. No. 13/481,336, filed May 25, 2012 and International application no. PCT/US2012/054069, filed Sep. 7, 2012, the disclosures of which are incorporated herein by reference in their entirety and made a part of this application.

The damper blade 16 is in the form of a sheet metal plate which can be made of any of several materials, including metal, plastic, composite, ceramic or the like. Generally the damper blade 16 is made of sheet metal and has a circular configuration as shown, which generally matches the generally circular cross-section of duct 14 as is the case in most HVAC systems. The present invention can be used with HVAC systems and ductwork of all types.

The damper blade 16 is fixedly attached to pivot rod 20 for rotation with bearing-type bushings 18 between a fully closed position and a fully open position, in which the damper is oriented at an angle of about 90 degrees relative to the fully closed position, or generally in line with the longitudinal axis A-A of the ductwork 14. Pivot rod 20 has a square cross-section to facilitate rotational coupling with damper blade 16.

When conditioned air (i.e., cooled or heated) is to be fully directed through the damper assembly 10, the damper blade 16 is fixed in the fully opened position. When only partial amounts of the conditioned air is to be directed through the damper assembly 10, then position of the damper blade 16 can be adjusted and fixed at a predetermined angle relative to the longitudinal axis. When the damper blade 16 is intended to completely block the flow of conditioned air through the damper assembly 10, then the damper blade 16 is moved to the closed position as shown in FIG. 1, and secured in that position by fasteners of various types. In general, when it is desired to block the conditioned air to a certain location (i.e., when the particular location is not in use), the damper blade is simply pivoted to the closed position and locked in place.

It can be fully appreciated that effective and efficient adjustment of such dampers ideally require that several conditions be met, the most significant of which include:
1) ready access to the adjustment device;
2) multiplicity of angular damper positions available to the user;
3) stability of the adjustment device in any number of angular damper positions, whereby vibrations are avoided;
4) quick and positive adjustment capability; and
5) remote visual indicator of the angular orientation of the damper blade, which itself is usually not visible to the user.

Figure 3:
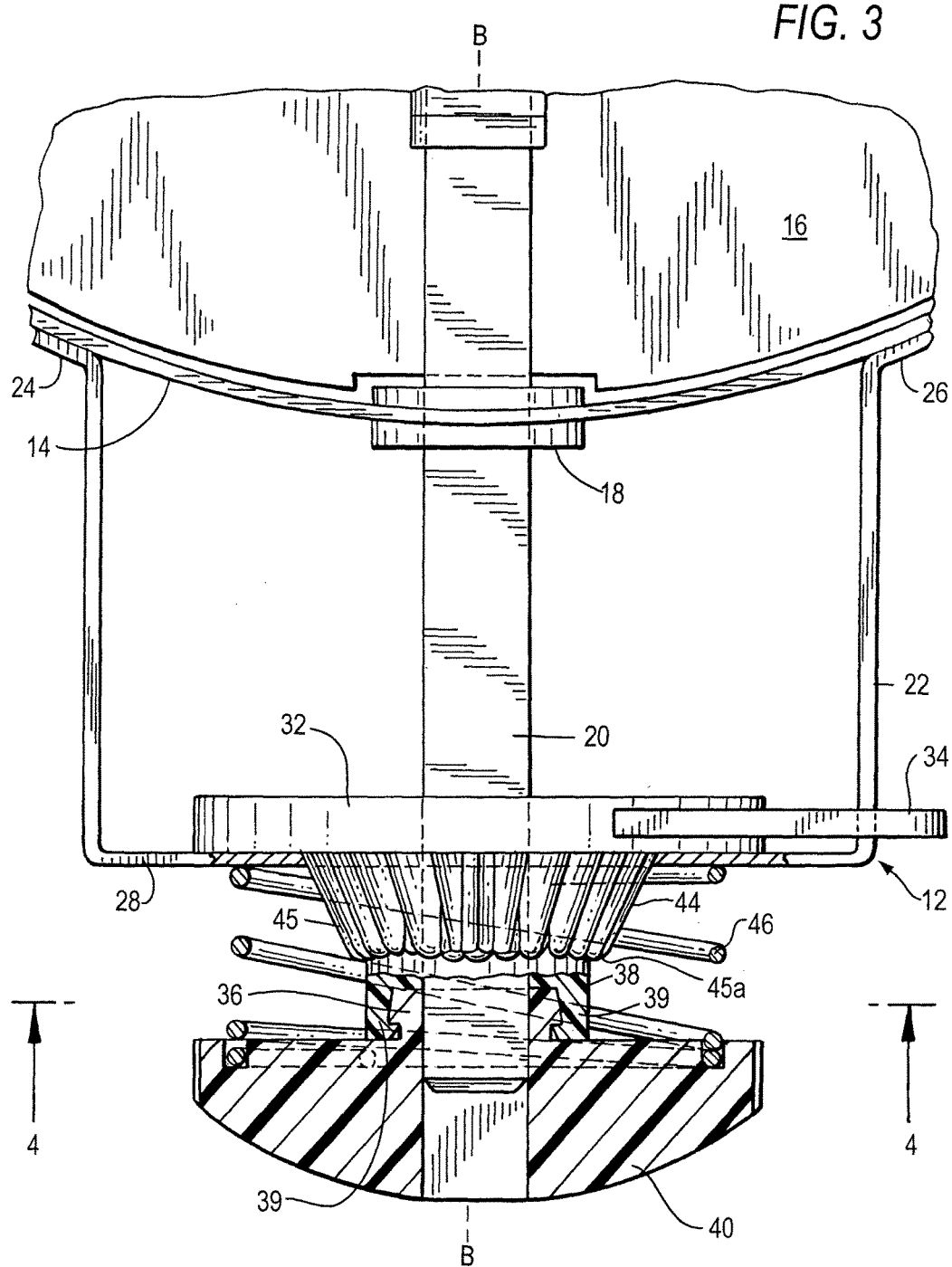
FIG. 3 is a partial cross-sectional view, taken along lines 3-3 of FIG. 2, of the adjustable damper regulator and lock device of FIG. 2, showing the device in the locked position to securely fix the damper angular orientation in a selected angular position.
Figure 5:
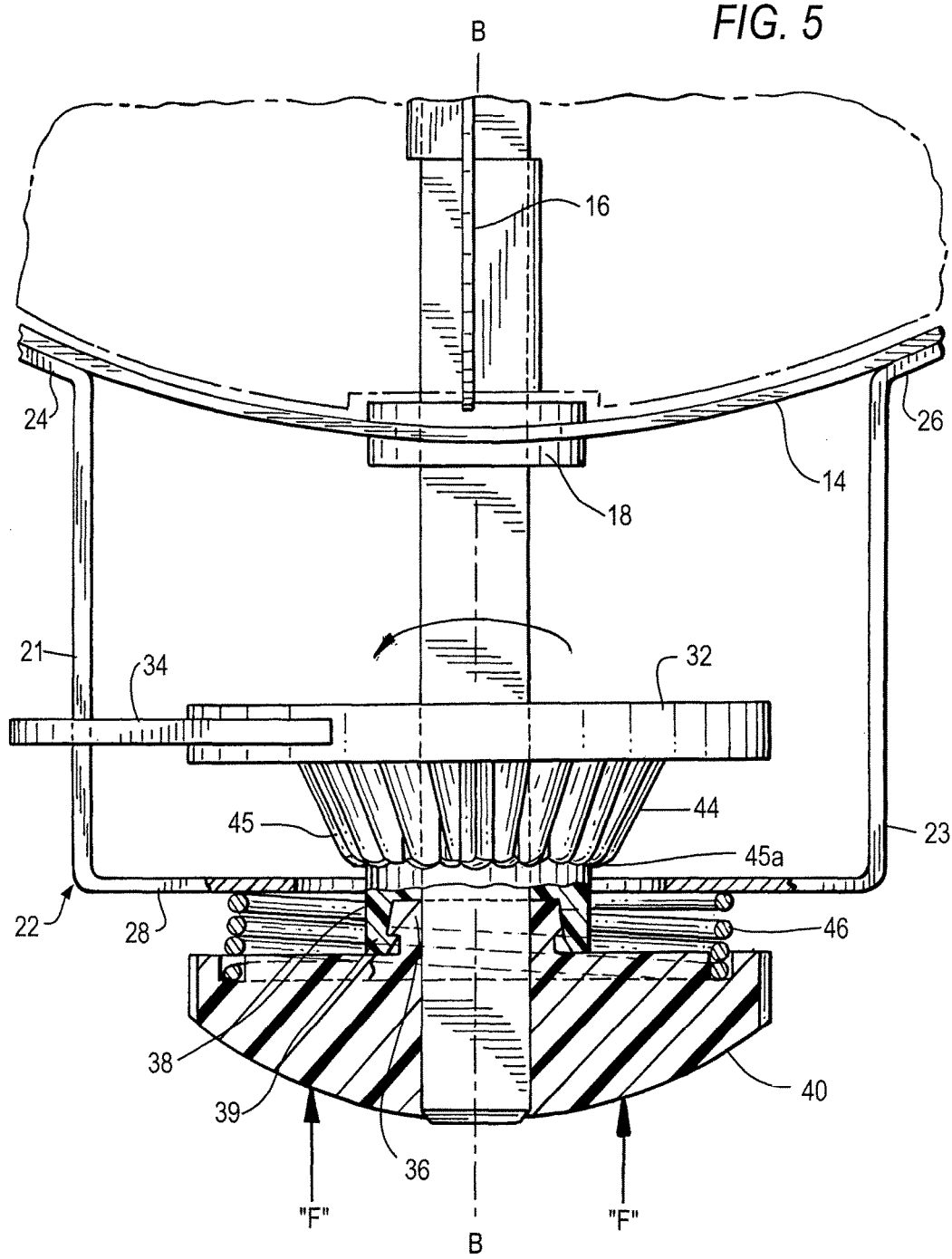
FIG. 5 is a partial cross-sectional view similar to FIG. 4, with the star shaped adjusting device moved manually to the "unlocked" position against the force of the coil spring, to facilitate pivotal movement of the damper blade to a predetermined selected angular orientation.
Figure 7:
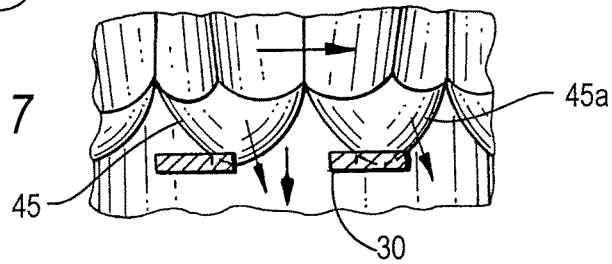
FIG. 7 is an enlarged top view of a portion of FIG. 6, illustrating the self-alignment feature of the lockdown device as the device is moved toward the locked position.
Figure 8:
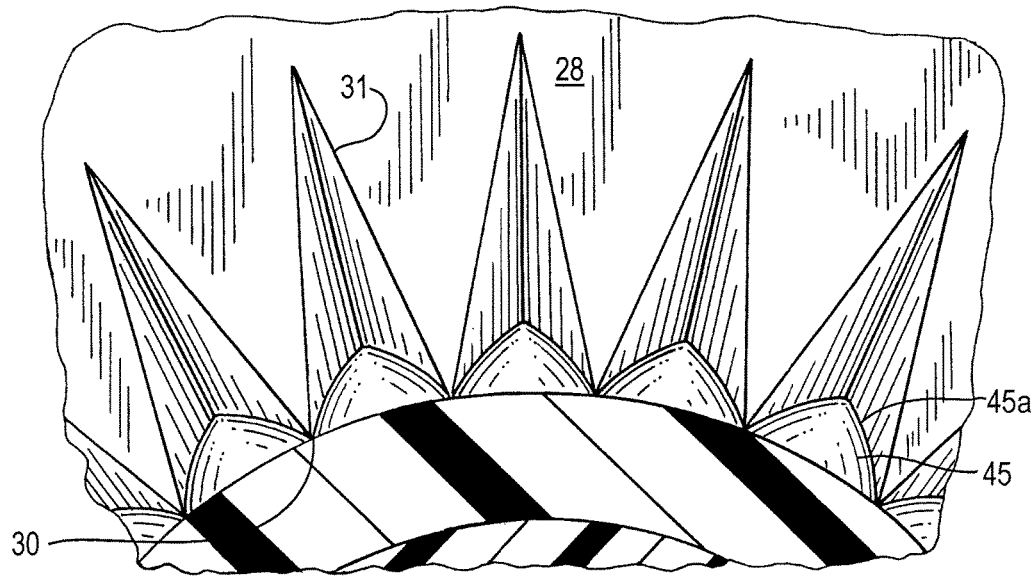
FIG. 8 is an enlarged portion of FIG. 6, showing the rotatable star-shaped lockdown engaging teeth in the engaged position in the corresponding star-shaped opening of the lock plate.
Figure 9:
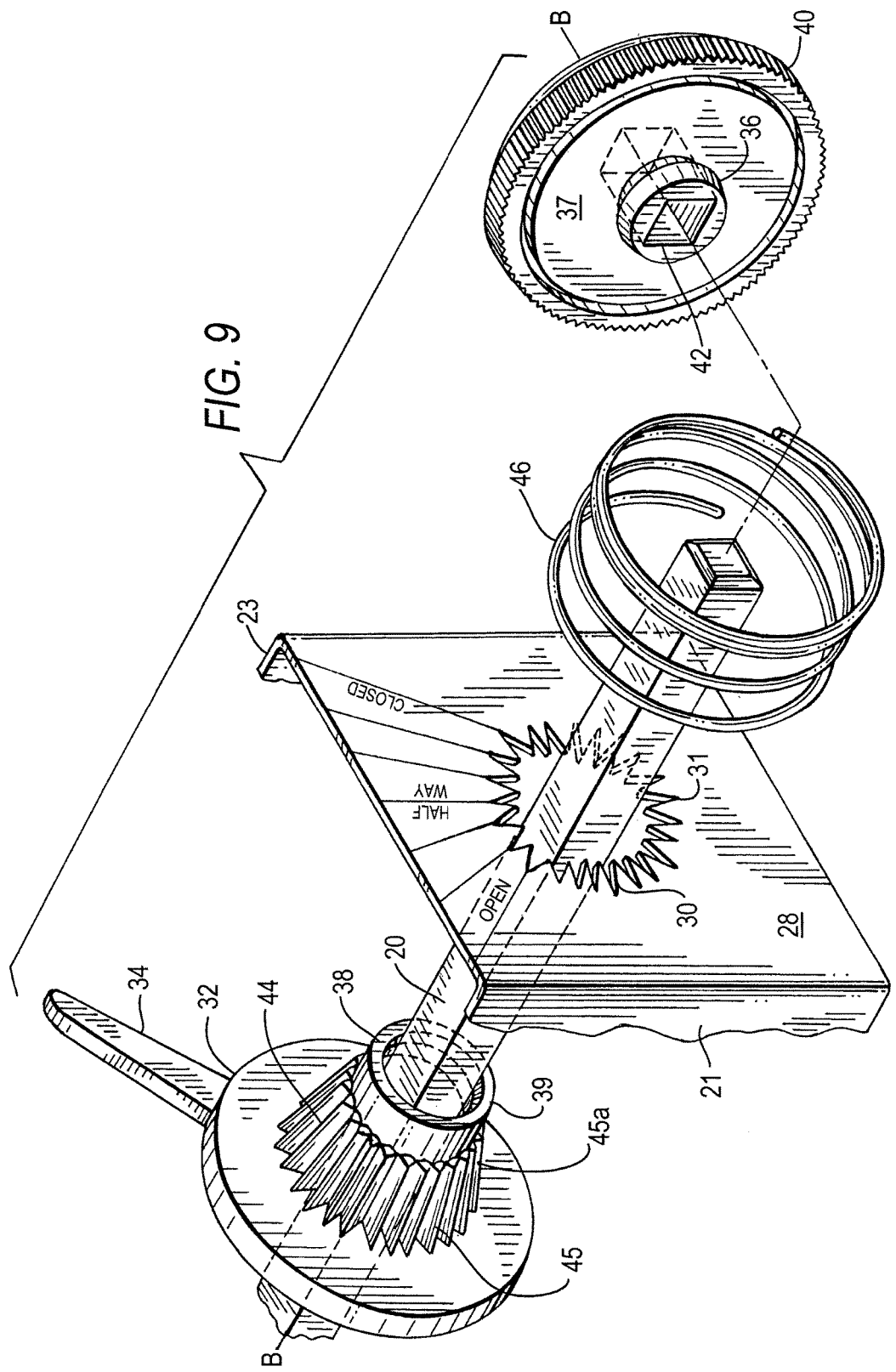
FIG. 9 is a top and left side perspective view of the adjustable damper regulator and lockdown device of the invention, with parts separated for illustrative purposes, showing the preferred star-shaped toothed lock device having a tapered configuration over its length.
Figure 10:
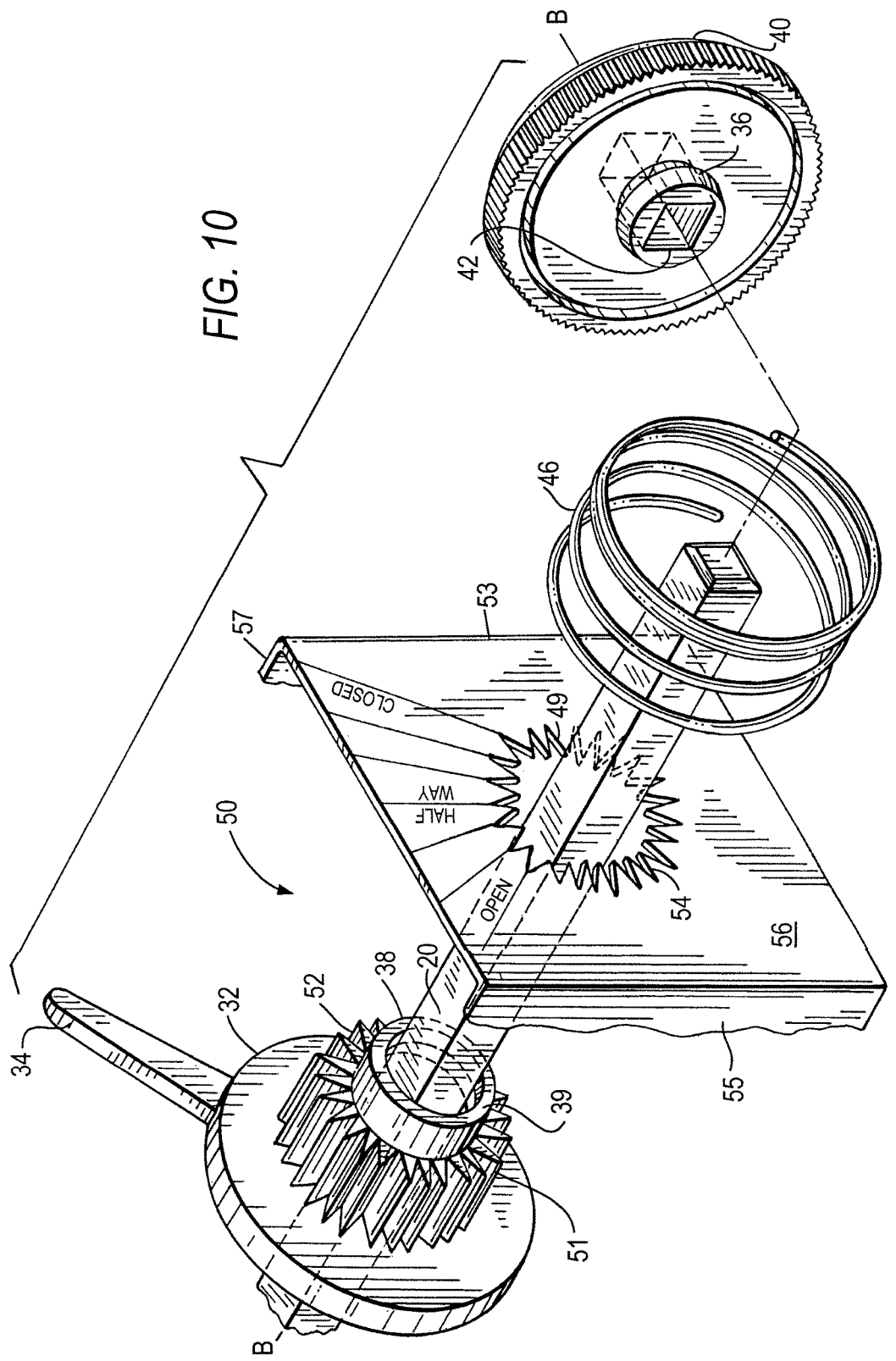
FIG. 10 is a top and left side perspective view of an alternative embodiment of the invention, with parts separated for illustration purposes, showing the star-shaped toothed lockdown device having a constant outermost dimension over its entire length.

Referring now to FIGS. 1-9, the structural and functional features of the adjustable regulator and lock device of the present invention are illustrated. The device 12 includes U-shaped bracket 22 of sheet metal, attached to the air duct of ductwork 14 by bent feet 24, 26 which can be attached to the ductwork in a known manner such as by spot welds or otherwise. The central section/plate 28 of U-shaped bracket 22 facing the outer surface of the air duct as shown, includes a generally circular star-shaped aperture 30 having a plurality of generally radially extending triangular shaped tooth shaped cutouts 31 positioned about the periphery of the opening 30 as best shown in FIGS. 9 and 10. Damper pivot rod 20 extends through the ductwork 14 and is pivotably supported on bearing-type bushings 18, 19 in perpendicular relation to the direction of air flow, as shown in FIGS. 1, 3 and 5.

As best seen in FIG. 9, pivotally rotatable plate 32 is attached to pivot rod 20 and has extending from one surface, a frusto-conical toothed lockdown member 44 having a plurality of radially extending tapered teeth 45 which correspond in number, dimension and shape to the tooth shaped cutouts 31 of the star-shaped opening in plate 28, making it possible to shift the tapered lockdown member 44 into and out of locking engagement with the star-shaped aperture 30 of plate 28 after rotating it to any one of a number of relative angular orientations of the lockdown member (and correspondingly, the damper) with respect to the plate 28. The tapered profile of toothed lockdown member 44 facilitates quick entry of teeth 45 into opening 30, due to the progressively decreasing outermost dimensions of the teeth 45 as measured along the axis B-B of pivot. Accordingly, plate 32 can be longitudinally moved along axis B-B of pivot rod 20, thereby moving lockdown member 44 into and out of engagement with plate 28. When the tapered lockdown member 44 is moved out of engagement with opening 30 in plate 28, plate 32 is free to rotate with damper blade 16 and pivot rod 20 to any of a number of angular positions corresponding to between a fully closed and a fully open damper position, respectively. When the tapered lockdown member 44 is shifted out of engagement with plate 28, knob 40 may be rotated counterclockwise or clockwise between "damper open" and "damper closed" positions, respectively.

As shown, when lever 34 engages the right side plate 23 of bracket 22, further movement is limited, and the damper is in the closed position. When the knob 40 is rotated until lever 34 engages the left side plate 21 of bracket 22, further movement is limited, and the damper is in the fully open position, as indicted by the marking "open". Rotation of the knob 40 in the clockwise direction will rotate the damper to other positions, as indicated by the markings, "half way" and "closed" in FIGS. 2, 4 and 9.

Circular shaped plate 32 having indicator lever 34 attached to, and extending radially therefrom, is movable along longitudinal axis B-B to positions whereby tapered lockdown member 44 can move into and out of engagement with the plate 28 to cause lockdown member 44 to engage with tooth shaped cutouts 31, to select a suitable angular position for the damper blade 16. The angular position of the damper is readily discernable to the user from the outside merely by observing the position of the lever arm 34, which also acts as a limit stop when it engages with the U-shaped bracket 22 as shown in FIG. 1.

Hub 36 is preferably molded unitarily from plastic, or otherwise attached to control knob 40 as best shown in FIGS. 3 and 9. It can be appreciated that rotation of knob 40 will produce corresponding rotation of pivot rod 20 and damper blade 16 with bushings 18, due to the square drive-type connection between square opening 42 in knob 40 and the same square cross-section of pivot rod 20, which is complementary to square opening 42 in knob 40. Plate 32 having indicator lever 34 extend radially therefrom is attached to damper shaft 20 for rotation therewith.

For the embodiment shown in FIGS. 1-9, the knob 40 is made of a suitable plastic material, with collar 38 also being made of plastic and being resiliently engaged with hub 36 by annular resilient leg 39 as best shown in FIG. 3. The plastic material may be nylon, polyester, polypropylene, ABS or any extrudable plastic material.

For applications subject to relatively extreme temperatures, the active components of the invention can be made of other suitable materials such as metal, ceramic, composites or the like, without departing from the scope of the invention.

Referring once again to the drawings, and in particular, to FIGS. 1-9, the toothed lockdown member 44 is retained in engagement with the star-shaped opening 30 in plate 28 by the force of resilient coil spring 46 positioned in engagement with plate 28 at one end, and with flat annular surface 37 of control knob 40 at the other end as best shown in FIG. 3.

When the lockdown member 44 is in engagement with plate 28 as shown in FIG. 3, the angular position of the damper blade is fixed by the force of coil spring 46 acting between plate 28 and knob 40 and by engagement of lockdown teeth 45 with mating tooth shaped cutouts 31 in plate 28.

Referring now to FIG. 5, the release and pivot function of the inventive device is illustrated. As can be seen, release of tapered toothed member 44 is made by manually pushing knob 40 inwardly with force "F" against spring 46 to cause lockdown member 44 to exit opening 30 and clear plate 28 from behind. Tapered lockdown teeth 45 are now clear of control engaging tooth shaped cutouts 31 in plate 28, which now permits the knob 40, the pivot rod 20, lever 34, and damper blade 16 to be pivotally rotated to any of a number of selected angular positions between "open" and "closed". In FIG. 5, for example, the damper blade 16 has been pivoted to the fully open position, as indicated by the position of lever 34, which is now engaged with the left wall 21 of U-shaped bracket 22. When the predetermined angular position of the damper blade 16 is reached (as visibly indicated by the position of lever 34), the force "F" is released by the user, and knob 40 is permitted to return to the original rest (and locked) position of FIGS. 1 and 3. At the same time, the lockdown teeth 45 of toothed member 44 re-enter the corresponding tooth shaped cutouts 31 of opening 30 in plate 28 at the new angular position, to firmly fix the new angular position of the damper blade 16.

Figure 6:
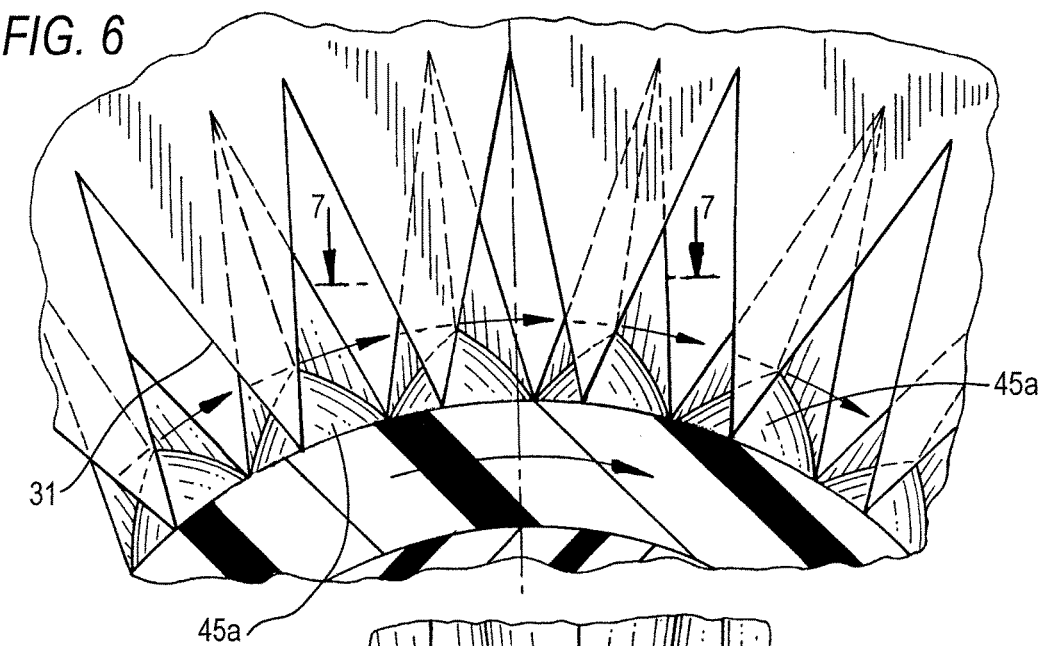
FIG. 6 is an enlarged view of a portion of FIGS. 3 and 5, illustrating the slightly rounded leading edges of the lockdown engaging teeth of the star-shaped adjusting device, which assist entry into the correspondingly configured star-shaped controlling engagement teeth of the opening in the lock plate, in the event of a slight mis-alignment between the teeth and the star-shaped opening in the lock plate, when adjusted by a user.

Referring now to FIGS. 6 and 7, one significant optional feature of the invention is illustrated. In particular, the leading edges 45a of the lockdown teeth 45 of toothed member 44 are slightly rounded as shown, to facilitate quick and smooth entry into the corresponding control engagement star-shaped tooth shaped cutouts 31 of opening 30 in plate 28. As can be seen, the rounded tips 45a of teeth 45 will readily enter the tooth shaped cutouts 31 of opening 30 in plate 28 in the event the user rotates the teeth 45 of toothed member 44 to a position which is not in complete alignment with the tooth shaped cutouts 31 of the opening 30. Such ready entry is particularly facilitated by the presence of the rounded tips of teeth 45. This assist will result in quick entry of lockdown teeth 45 into star-shaped tooth shaped cutouts 31 of opening 30 of plate 28 of U-shaped bracket 22 as shown in FIG. 8. This action is also illustrated in FIGS. 6 and 7, where FIG. 7 is a partial cross-sectional view taken along lines 7-7 of FIG. 6.

It can be seen that the present invention provides a number of advantages over prior art devices which are intended to adjust the angular position of a ductwork damper, and to lock the position of the damper in a selected angular orientation.

The present invention is easy to manufacture, and includes a relatively small number of components, given the relatively complex function and objective which it provides. Secondly, the invention provides quick and secure positioning of the angular position of the damper, by the distribution of the lockdown force over a substantial number of tooth shaped cutouts 31 extending over the entire periphery of the opening 30 in plate 28. Considering the force of air flow against the damper blade in the closed position, this feature provides a clear advantage of the present invention in that the forces to retain the damper in position are distributed over a substantial number of teeth thereby promoting stability and minimizing vibrations. In addition, by the position of the indicator lever 34, the invention provides a clear and ready observable indicator to the user of the angular position of the damper, which is generally hidden from sight. Optimally, markings indicating the angular position of the damper blade 16 can be provided on plate 28 as shown in FIGS. 2, 4, 9 and 10, which correspond to the positions of the lever arm 34. By selecting the number of teeth on tapered member 44 and in circular opening 30, the angular spacing between positions can be varied, depending upon the needs of a particular application. Finally, it can be appreciated that adjustment of the damper position can also be made by manually gripping and rotating lever arm 34.

An Alternative Embodiment

While the embodiment shown in FIGS. 1-9 preferably incorporates a toothed lockdown member 44 having a tapered side elevational profile as shown, an alternative embodiment 50 is shown in FIG. 10 which incorporates a toothed lockdown member 52 which includes a plurality of radially extending teeth 51 similar to the previous embodiment, but which teeth have a constant outermost dimension over their entire length as measured along the axis B-B of pivot rod 20. U-shaped bracket 53 includes central section/plate 56, right side plate 57 and left side plate 55. In all other respects, this alternative embodiment is structured identically, and functions in the same manner as the previous embodiment. For example, the opening 54 of plate 56 has a plurality of tooth shaped cutouts 49 positioned about the periphery of the opening 54.

While the embodiment of FIG. 10 does not provide the ease of entry into the opening 54 of plate 56 as with the tapered embodiment of FIGS. 1-9, it nevertheless functions well, requiring the user to "feel" the path of the toothed engagement member between the teeth 51 of the toothed lockdown member 52 and the opening 54 in plate 56.

Figure 11:
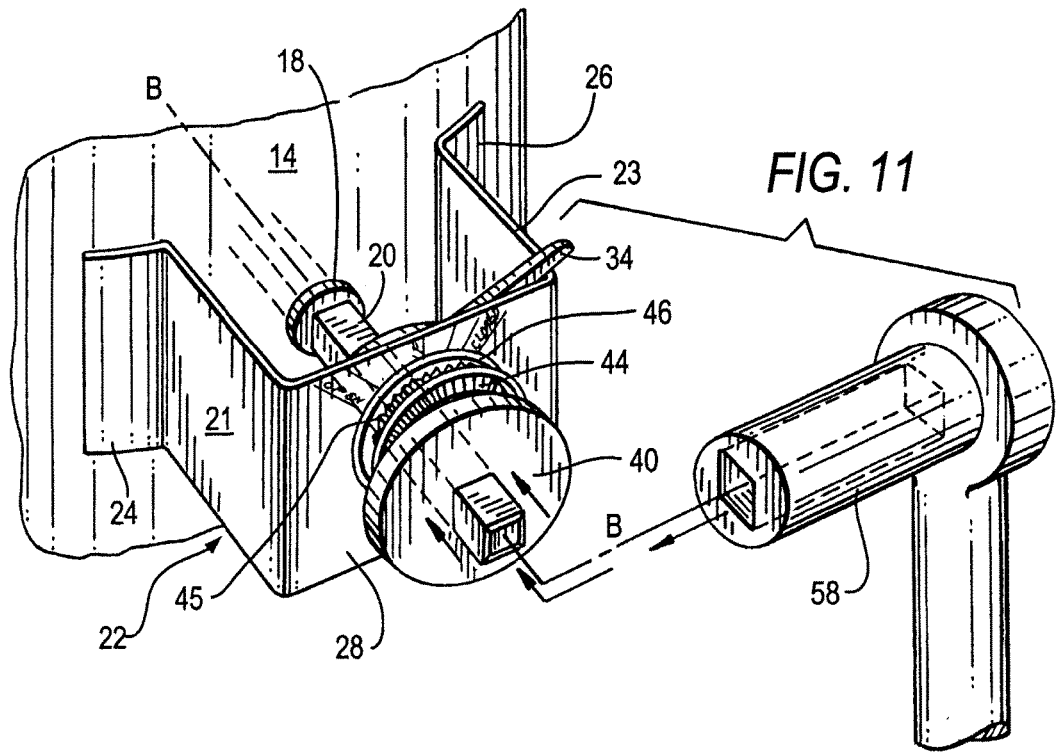
FIG. 11 is a top and left side perspective view of an alternative embodiment of the adjustable damper regulator and lockdown device of the invention, wherein the adjustment of the damper blade can be made using a tool such as a wrench having a square drive socket.

Referring now FIG. 11, there is shown an embodiment of the present invention, wherein the adjustment of the damper blade can be made using a tool such as a wrench having a square drive socket 58 to firmly grip the pivot rod of square cross section. Generally such pivot rods are approximately ⅜ inch square. Accordingly, a square drive socket wrench will be appropriate.

Figure 12:
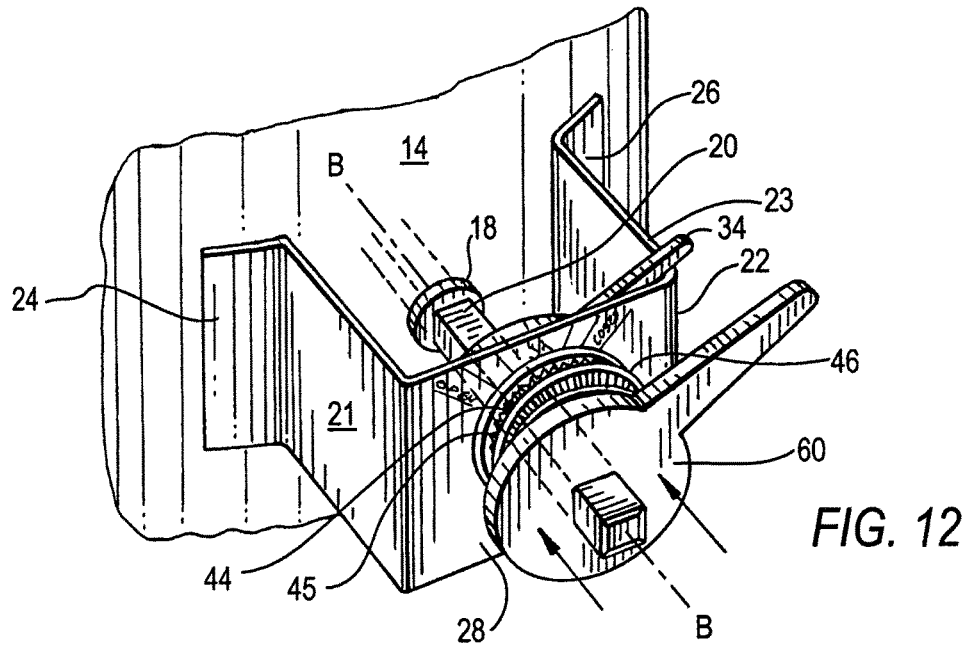
FIG. 12 is a top and left side perspective view of yet another alternative embodiment of the invention, wherein a wrench-like lever device is permanently attached to the shaft of the damper regulator and lockdown device, and is utilized, when needed, to adjust the damper blade position according to the invention, said lever providing a ready indicator of the angular portion of the damper.

Referring now to FIG. 12, there is shown yet another alternative embodiment of the invention, wherein a wrench-like lever 60 is permanently attached to the damper pivot rod for ready adjustment as and when needed.

LIST OF REFERENCE NUMERALS

10 Damper Assembly
12 Adjustable Regulator and Lock Device
14 Duct
16 Damper Blade
18, 19 Bushings
20 Damper Pivot Rod or Shaft
21 Left Side Plate
22 U-Shaped Bracket
23 Right Side Plate
24, 26 Bent Feet
28 Central Section of U-Shaped Bracket 22
29 Left Wall of U-Shaped Bracket
30 Generally Circular Star-Shaped Aperture in Central Section 28
31 Control Engaging Teeth in Central Section 28
32 Pivotable Circular Plate
34 Indicator Lever
36 Hub
38 Collar
39 Annular Resilient Legs
40 Knob
42 Square Opening in Knob 40
44 Frusto-Conical Tapered Toothed Member Having Tapered Lockdown Teeth
45 Tapered Lockdown Teeth
45a Rounded Leading Edges of Tapered Lockdown Teeth
46 Coil Spring to Bias Elongated Member in Locked Position
49 Engaging Controlling Teeth in Plate 56
50 Alternative Embodiment having Elongated Toothed Member of Constant Diametral Dimension 51 Teeth
52 Toothed Lockdown Member of Constant Diametral Dimension
53 U-Shaped Bracket in Alternative Embodiment
54 Generally Circular Star-Shaped Opening in Plate 56
55 Left Side Plate of Bracket 53
56 Central Plate Having Generally Circular Star-Shaped Opening 54, with Teeth 49 to Receive Toothed Lockdown Member 52
57 Right Side Plate of Bracket 55
58 Square Drive Socket Wrench
60 Wrench-Like Lever Permanently Attached to Device

The invention claimed is:

1. An adjustable regulator and lock device for a damper blade adapted for installation in an air duct, which comprises:
   a) an elongated pivot member coupled to said damper blade for rotation therewith, said elongated pivot member having a generally longitudinal rotational axis generally transverse to the direction of air flow in said air duct;
   b) a plate member supported outside of said air duct, and spaced from an outer surface portion thereof, said plate member having an opening through which said elongated pivot member extends;
   c) a lockdown member having a plurality of radially outwardly extending teeth members, said lockdown member being configured to always remain fixedly coupled to said elongated pivot member such that said lockdown member always rotates simultaneously with said elongated pivot member during use, said lockdown member and said teeth members further being movable toward and away from said plate member in corresponding directions extending along said longitudinal axis; and
   d) a plurality of correspondingly positioned generally radially extending cutouts positioned about a periphery of said opening of said plate member, each said cutout being configured and dimensioned to receive one of said teeth members of said lockdown member to prevent rotation of said lockdown member and said elongated pivot member to thereby fix the angular orientation of said damper blade;
   e) a manually operable control knob slidably positioned on said elongated pivot member and located outside said plate member, said control knob coupled to said lockdown member for manually controlling the axial and rotational positions of said lockdown member; and
   f) a resilient spring device positioned between said manually operable control knob and said plate member to bias said control knob away from said plate member and to retain said radially extending teeth members of said lockdown member in engagement with said radially extending cutouts in said plate member to thereby releasably retain said fixed angular orientation of said damper blade in said air duct.

2. The adjustable regulator and lock device according to claim 1, wherein said teeth members of said lockdown member are generally triangular in shape.

3. The adjustable regulator and lock device according to claim 2, wherein said plurality of cutouts in said plate member are configured similar to the cross-sectional shape of said radially extending teeth members of said lockdown member.

4. The adjustable regulator and lock device according to claim 3, wherein the side elevational profile of said radially outwardly extending teeth members of said lockdown member is generally tapered.

5. The adjustable regulator and lock device according to claim 4, wherein said plate member is attached to the outside surface of said air duct.

6. The adjustable regulator and lock device according to claim 5, wherein the outermost dimension of said radially outwardly extending teeth members of said lockdown member is progressively increased as measured along the length of said elongated member and in a direction extending from said plate member toward said air duct.

7. The adjustable regulator and lock device according to claim 6, wherein said plurality of teeth members of said lockdown member are movable longitudinally by manually moving said control knob and said lockdown member against the force of said spring device to disengage said lockdown member from said plate member to thereby permit rotational adjustment of the angular orientation of said damper blade in said air duct.

8. The adjustable regulator and lock device according to claim 7, wherein said resilient device positioned between said manually operable control knob and said plate member is a coil spring extending around said elongated pivot member.

9. The adjustable regulator and lock device according to claim 8, wherein said generally radially extending cutouts in said plate member are generally triangular to match the cross-section of each said outwardly extending generally triangular shaped teeth members of said lockdown member.

10. The adjustable regulator and lock device according to claim 9, wherein said manually operable control knob has a knurled outer surface and said resilient coil spring is in engagement with said control knob at one end and with said plate member at the other end thereof.

11. The adjustable regulator and lock device according to claim 10, further comprising a lever coupled for rotational movement with said lockdown member and visible to a user to provide a visual indicator of the angular orientation of said lockdown member and said damper blade.

12. The adjustable regulator and lock device according to claim 11, further comprising side plates adjacent said plate member and positioned to be engaged by said lever to limit rotational movement of said elongated pivot member, said lockdown member and said damper blade between respective minimum and maximum angular orientations.

13. The adjustable regulator and lock device according to claim 12, wherein the outermost dimension of said radially outwardly extending teeth members of said lockdown member is constant as measured along the length of said elongated member.

14. An adjustable regulator and lock device for a pivotally rotatable damper blade adapted for installation in an air duct, which comprises;
   a) an elongated pivot rod extending through said air duct and generally transverse to the direction of air flow in said air duct, said elongated pivot rod having said damper blade rotatably coupled thereto and being rotatably mounted in said air duct for rotation between open and closed positions of said damper blade;
   b) a plate member mounted to the outside of said air duct and generally facing an outer surface portion of said air duct, said plate member having an opening through which said elongated pivot rod extends;
   c) a lockdown member rotatably coupled to said elongated pivot rod and having a plurality of radially extending engagement devices movable into and out of engagement with correspondingly positioned mating engagement devices of said plate member to selectively fix the rotational position of said damper blade, said lockdown member being configured to always remain fixedly coupled to said elongated pivot rod such that said lockdown member always rotates simultaneously with said elongated pivot rod during use;

d) a manually operable control device slidably positioned on said elongated pivot rod and positioned outside said plate member for ready access thereto, said control device for manually controlling the angular orientation of said elongated pivot rod and said damper blade; and e) a resilient device positioned between said manually operable control device and said plate member to bias said control device toward a position of engagement of said lockdown member with said plate member to fix the angular orientation of said elongated pivot rod and said damper blade, whereby application of force to said control device against said resilient device releases said radially extending engagement devices of said lockdown member from said plate member to permit rotation of said elongated pivot rod and said damper blade to a selected angular orientation.

15. The adjustable regulator and lock device according to claim 14, wherein said manually operable control device is a grip knob rotatably coupled with said elongated pivot rod, whereby manual application of rotational force to said grip knob produces corresponding rotation of said damper blade.

16. The adjustable regulator and lock device according to claim 15, wherein said lockdown member is biased toward an engaged and locked position with said plate member by said resilient device positioned between said control device and said plate member.

17. The adjustable regulator and lock device according to claim 16, wherein said resilient member is a coil spring and said control device is a control knob having an outer knurled surface for gripping.

18. The adjustable regulator and lock device according to claim 17, further comprising a lever coupled for rotational movement with said lockdown member and visible to a user to provide a visual indicator the angular orientation of said lockdown member and said damper blade.

19. The adjustable regulator and lock device according to claim 18, further comprising side plates adjacent said plate member and positioned to be engaged by said lever to prevent further rotational movement of said elongated pivot rod, said lockdown member and said damper blade between respective minimum and maximum angular orientations.

20. A damper unit for pivotal attachment to a section of sheet metal ductwork having an air duct, for selectively directing conditioned air in a predetermined direction, which comprises:

a) a metal plate member which forms a damper blade having a predetermined shape;

b) an elongated pivot rod to which said damper blade is attached, for pivotally mounting said damper blade in said air duct for simultaneous pivotal rotation, said elongated pivot rod having a generally square cross section and defining a longitudinal pivot axis;

c) an adjustable regulator and lock device for said damper blade, which comprises:

i) a plate member supported adjacent and outside of said air duct, said plate member facing an outer surface portion of said air duct and having an opening through which said elongated pivot rod extends;

ii) a lockdown member rotatably coupled to said elongated pivot rod, said lockdown member having a plurality of outwardly extending engagement devices and movable toward and away from said plate member in directions extending along said longitudinal axis, said lockdown member being configured to always remain fixedly coupled to said elongated pivot rod such that said lockdown member always rotates simultaneously with said elongated pivot rod during use;

iii) a plurality of correspondingly positioned, configured and dimensioned mating engagement devices associated with said plate member, said engagement devices of said plate member adapted to engage with said engagement devices of said lockdown member when said elongated pivot rod and said damper blade are rotated to a selected angular position, and said engagement devices of said lockdown member are placed into engagement with said engagement devices of said plate member to prevent rotation of said elongated pivot rod and thereby fix the angular orientation of said damper blade;

iv) a manually operable control device slidably positioned on said elongated pivot rod and located outside said plate member for ready access thereto, said control device for manually controlling the angular orientation of said elongated pivot rod and said damper blade; and v) a resilient device positioned between said manually operable control device and said plate member to bias said control device toward a position of engagement of said lockdown member with said plate member to fix the angular orientation of said elongated pivot rod and said damper blade, whereby application of force to said control device against the force of said resilient device releases said radially extending engagement devices of said lockdown member from said plate member to permit rotation of said pivot rod and said damper blade to a selected angular orientation.

21. The damper unit according to claim 20, wherein said manually operable control device is a grip knob coupled for rotation with said elongated pivot rod and said lockdown member to facilitate manual rotation of said lockdown member, and said resilient device is a coil spring positioned between said grip knob and said plate member to bias said lockdown member into engaged relation with said plate member.

22. Ductwork for directing conditioned air in a predetermined direction, which comprises:

a) at least a section of sheet metal ductwork having an air duct having a generally tubular configuration and a generally circular cross-section;

b) a damper unit for pivotal attachment to a section of said air duct, for selectively directing conditioned air in a predetermined direction, which comprises:

i) a metal plate member which forms a damper blade having a predetermined shape;

ii) an elongated pivot rod having a generally square cross-section rotatably coupled with said damper blade;

iii) an adjustable regulator and lock device which comprises:

A) a plate member positioned adjacent and outside of said air duct, said plate member facing an outer surface portion of said air duct and having an opening through which said elongated pivot rod extends;

B) a lockdown member rotatably coupled to said elongated pivot rod, said lockdown member having a plurality of engagement devices and being movable toward and away from said plate member in directions along said longitudinal axis, said lockdown member being configured to always remain fixedly coupled to said elongated pivot rod such that said lockdown member always rotates simultaneously with said elongated pivot rod during use;

C) a plurality of correspondingly positioned, configured and dimensioned mating engagement devices associated with said plate member, said engagement devices of said plate member adapted to engage with said engagement devices of said lockdown member when said lockdown member and said damper blade are rotated to a selected angular position, and said engagement devices of said lockdown member are placed into engagement with said engagement devices of said plate member to prevent rotation of said elongated pivot rod and thereby fix the angular orientation of said damper blade;

D) a manually operable control device slidably positioned on said elongated pivot rod and positioned outside said plate member for ready access thereto, said control device being rotatably coupled with said elongated pivot rod for manually controlling the angular orientation of said elongated pivot rod and said damper blade; and E) a resilient device positioned between said manually operable control device and said plate member to bias said control device toward a position of engagement of said lockdown member with said plate member to fix the angular orientation of said elongated pivot rod and said damper blade, whereby application of force to said control device against the force of said resilient device releases said engagement devices of said lockdown member from said plate member to permit rotation of said control device, said pivot rod and said damper blade to a selected angular orientation.

23. The ductwork according to claim 22, wherein said manually operable control device is a grip knob to facilitate manual rotation of said lockdown member.

24. The ductwork according to claim 23, wherein said plurality of engagement devices of said lockdown member comprise radially extending, generally triangular tooth-shaped engagement devices and said mating engagement devices associated with said plate member comprise generally triangular tooth-shaped cutouts positioned about a periphery of said opening of said plate member configured, dimensioned and adapted to receive said tooth-shaped engagement devices of said lockdown member to fix the angular orientation of said lockdown member and said damper blade.

25. The adjustable regulator and lock device according to claim 24, further comprising a lever coupled for rotational movement with said lockdown member and visible to a user to provide a visual indicator the angular orientation of said lockdown member and said damper blade.

26. The adjustable regulator and lock device according to claim 25, further comprising side plates adjacent said plate member and positioned to be engaged by said lever to prevent further rotational movement of said elongated pivot rod, said lockdown member and said damper blade between respective minimum and maximum angular orientations.

* * * * *